(12) United States Patent
Dicello et al.

(10) Patent No.: US 6,513,671 B2
(45) Date of Patent: Feb. 4, 2003

(54) KIT TO STORE A PLURALITY OF FOOD ITEMS AT A FOOD PREPARATION STATION AND PLASTIC INSULATING PANEL FOR USE THEREIN

(75) Inventors: Leonard G. Dicello, Taylor, MI (US); Allan J. Rose, Brighton, MI (US)

(73) Assignee: Domino's Pizza PMC, Inc., Ann Arbor, MI (US)

( * ) Notice: Subject to any disclaimer, the term of this patent is extended or adjusted under 35 U.S.C. 154(b) by 0 days.

(21) Appl. No.: 09/780,267

(22) Filed: Feb. 9, 2001

(65) Prior Publication Data

US 2002/0148831 A1 Oct. 17, 2002

Related U.S. Application Data

(60) Provisional application No. 60/182,703, filed on Feb. 15, 2000.

(51) Int. Cl.[7] .............................................. B65D 21/02
(52) U.S. Cl. ................. 220/23.4; 220/592.02; 220/23.88
(58) Field of Search ........................... 220/23.83, 23.86, 220/23.88, 23.4, 592.04, 592.03, 592.02; 126/9 R, 33, 377, 369; 312/236; 108/26, 90, 157; 62/258

(56) References Cited

U.S. PATENT DOCUMENTS

| | | | | |
|---|---|---|---|---|
| 1,734,667 A | * | 11/1929 | Fiore | |
| 1,741,569 A | * | 12/1929 | Hindman | |
| 2,942,921 A | * | 6/1960 | Rachman et al. | 108/26 |
| 3,052,508 A | * | 9/1962 | Fink | 220/23.83 |
| 3,952,905 A | * | 4/1976 | Rumrill | 220/592.04 |
| 4,599,314 A | * | 7/1986 | Shami | 220/23.4 |
| 5,119,799 A | * | 6/1992 | Cowan | 126/59 |
| 5,163,536 A | * | 11/1992 | Tuhro et al. | 186/44 |
| 5,699,784 A | * | 12/1997 | Tippmann et al. | |
| 5,992,406 A | * | 11/1999 | Lelle | |

* cited by examiner

*Primary Examiner*—Stephen Castellano
(74) *Attorney, Agent, or Firm*—Brooks & Kushman P.C.

(57) ABSTRACT

A kit from which a plurality of parts are selected and arranged to store a plurality of food items in a refrigerated space at a food preparation station is provided. The kit includes a plurality of food containers. Each container is to contain a food item in a lower portion thereof. The kit also includes a plurality of plastic insulating panels. Each of the panels has upper and lower surfaces. When selected panels are arranged side-by-side at the food preparation station, the panels form an upper insulating wall of the refrigerated space. A first set of the panels has an array of holes for receiving and retaining the containers therein so that the lower portions of the containers are suspended in the refrigerated space below the lower surfaces of the arranged panels.

13 Claims, 5 Drawing Sheets

KIT TO STORE A PLURALITY OF FOOD ITEMS AT A FOOD PREPARATION STATION AND PLASTIC INSULATING PANEL FOR USE THEREIN

CROSS-REFERENCE TO RELATED APPLICATIONS

This application claims the benefit of U.S. provisional application Ser. No. 60/182,703, filed Feb. 15, 2000 entitled "Apparatus and System for Selection and Storage of Food Items."

TECHNICAL FIELD

This invention relates to kits to store a plurality of food items at a food preparation station and plastic insulating panels for use therein and, in particular, to kits to store a plurality of food items at a food preparation station and plastic insulating panels for use therein in a refrigerated space.

BACKGROUND ART

The food service industry has experienced a series of transformations and challenges in recent years. Consumer demand for new and varied food item selections has increased while historically low national unemployment has caused many restaurants and restaurant chains to develop innovative methods for utilizing a shrinking labor pool of skilled workers. In addition, restaurants and food service providers are continually faced with the cost and expense of food spoilage, storage and refrigeration expenses, and preservation of food ingredients in order to produce a visually appetizing and good tasting food item.

Typically, food service providers have utilized a variety of stainless steel tubs as illustrated in FIG. 3, plastic tubs or receptacles as illustrated in FIGS. 4, 6 and 7, or other fixed receptacles to hold food items in what is referred to as a "makeline" at a refrigerated food preparation station, as illustrated in FIG. 1. The food service workers are generally stationed in front of the makeline and select the specific items or toppings needed for the food item from any number of tubs or receptacles embedded within the makeline. These types of rigid makelines are well known in the art and are utilized by many QSR entities to prepare submarine sandwiches, hamburgers, Mexican entrees, and pizza. Such makelines typically come in various lengths (i.e., 6 foot, 7 foot and 8 foot) and models wherein the widths of the top rail or counter which support the tubs or receptacles vary.

However, these devices also require the workforce to physically replenish the tub or receptacle with bulk food material when the tub or receptacle is depleted. Very often, this extra step results in spoilage of food items which fall outside of the receptacle, disruption of the food preparation process, and repeated use of valuable labor resources who may have to continually replace the stock of high demand foot items such as cheese for pizza, etc. Moreover, each of the tubs or receptacles needs to be thoroughly cleaned and sanitized at the end of the work shift or day. Hence, these prior art makelines do not optimize labor resources or work to minimize product spoilage.

As illustrated in FIG. 2, some makelines utilize stainless steel gap fillers which fill any space between food tubs to prevent food from falling between tubs and into the refrigerated space of the makeline.

Although a number of devices are found in the prior art which attempt to provide a removable tub which can be separated from the makeline for cleaning purposes, these prior art devices are often bulky and cumbersome. Some of these devices are stainless steel tubs which are often expensive and do not allow the user to remove and insert different sized tubs from the makeline with ease.

FIG. 5 illustrates a prior art apertured plastic sheet for holding round plastic food tubs and bottles of FIGS. 6 and 7, respectively. The plastic sheet of FIG. 5, however, is relatively heavy and cumbersome to handle, especially when it is desired to clean the sheet in a standard size sink. Also, the plastic sheet is designed to fit only one type of makeline.

Further, these devices do not encompass an ergonomic or modular feature whereby the size of the receptacle used is specifically correlated to the volume of the particular food item required during the course of a given work shift. In most cases, the food service workers are still required to replenish the depleted tub with new food product thereby running the risk of excess spoilage and interrupting the flow of food preparation. Moreover, the lack of a modular feature or ease of transitioning to the selection of new food items can cause substantial down time in the food preparation process.

DISCLOSURE OF INVENTION

An object of the present invention is to provide a kit to store a plurality of food items at a food preparation station and plastic insulating panel for use therein wherein the kit is modular, flexible and can be customized to fit makelines of varying lengths and models.

Another object of the present invention is to provide a kit to store a plurality of food items at a food preparation station and plastic insulating panel for use therein wherein substantially more food storage locations can be provided at the top rail of a makeline to accommodate lower volume or non-core food items.

Yet another object of the present invention is to provide a kit to store a plurality of food items at a food preparation station and plastic insulating panel for use therein wherein the parts of the kit are relatively easy to clean and sanitize in standard sinks.

Yet still another object of the present invention is to provide a kit to store a plurality of food items at a food preparation station and plastic insulating panel for use therein wherein food containers of the kit can be easily removed and replaced from an insulating panel of the kit and wherein lids for the containers can also easily be placed on and removed from the containers.

In carrying out the above objects and other objects of the present invention, a kit from which a plurality of parts are selected and arranged to store a plurality of food items in a refrigerated space at a food preparation station is provided. The kit includes a plurality of food containers. Each container is to contain a food item in a lower portion thereof. The kit also includes a plurality of panels. Each of the panels has upper and lower surfaces. When selected panels are arranged side-by-side at the food preparation station, the panels form an upper wall of the refrigerated space. A first set of the panels has an array of holes for receiving and retaining the containers therein so that the lower portions of the containers are suspended in the refrigerated space below the lower surfaces of the arranged panels.

A first set of the containers may have generally square lower portions. The array of holes include generally square holes for receiving and retaining the generally square lower portions of the first set of containers therein. The square holes of the first set of panels may be arranged in rows and columns.

A second set of the containers may have generally round lower portions. The array of holes include generally round holes for receiving and retaining the generally round lower portions of the second set of containers therein.

A second set of the panels may include at least one spacer panel.

The upper surfaces of the arranged panels may provide a substantially flat, continuous surface to prevent food items from falling into the refrigerated space.

The lower surfaces of the arranged panels may provide a substantially flat, continuous surface to maintain refrigerated air within the refrigerated space.

The containers are preferably plastic food containers.

A lid-receiving upper portion of each of the containers may be spaced above the upper surface of the arranged panels when the containers are received and retained in the array of holes to permit easy removal of the containers from the first set of panels.

The kit may include at least one member having a hole for receiving and retaining a generally round lower portion of one of the containers. The at least one member engages the upper surface of one of the first set of panels about one of the array of holes for supporting the lower portion of the one of the containers in the refrigerated space.

The at least one member may be a ring wherein the one of the array of holes is a generally round hole or the at least one member may be a substantially square panel wherein the one of the array of holes is a generally square hole.

Each of the panels may include an overhang portion formed at opposite ends thereof for support of the panel at the food preparation station.

Further in carrying out the above objects and other objects of the present invention, a plastic insulating panel having upper and lower surfaces is provided. The panel is sized to be arranged side-by-side adjacent to at least one other plastic insulating panel at a food preparation station forming an upper insulating wall of a refrigerated space. The panel has an array of holes for receiving and retaining food containers therein so that lower portions of the containers are suspended in the refrigerated space below the lower surface of the panel.

The array of holes may include generally square holes for receiving and retaining generally square lower portions of containers therein. The square holes of the panel may be arranged in rows and columns.

The array of holes may include generally round holes for receiving and retaining generally round lower portions of containers therein.

The panel may include an overhand portion formed at opposite ends thereof for support of the panel at the food preparation station.

The plastic of the panel may be high density polyethylene.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
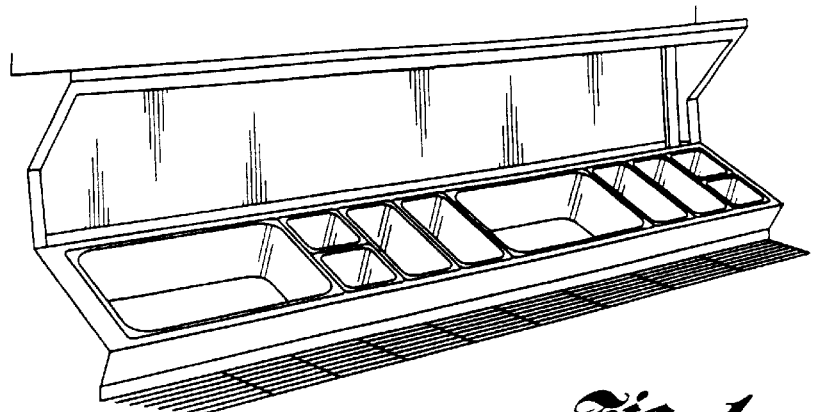
FIG. 1 is a perspective view, partially broken away, of a prior art makeline at a food preparation station wherein the makeline includes a hinged clear plastic sheet which acts as a hood and is movable between open and closed positions.
Figure 2:
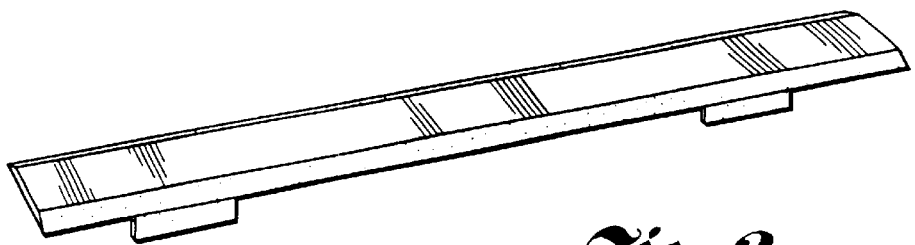
FIG. 2 is a perspective view of a prior art stainless steel gap filler which fills space between tubs to prevent food from falling between the tubs.
Figure 3:
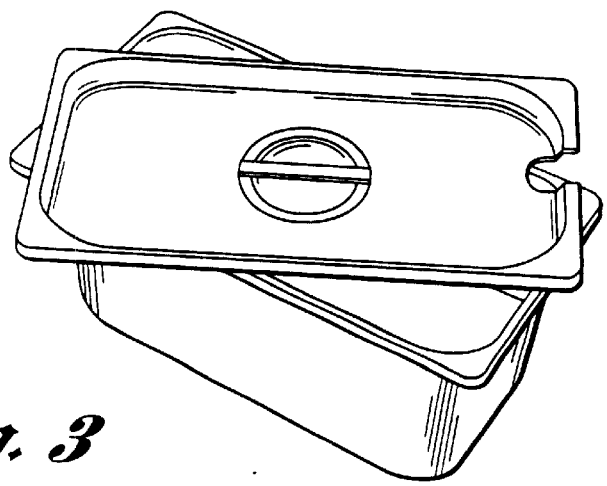
FIG. 3 is a perspective view of a prior art stainless steel pan or bin with its lid.
Figure 4:
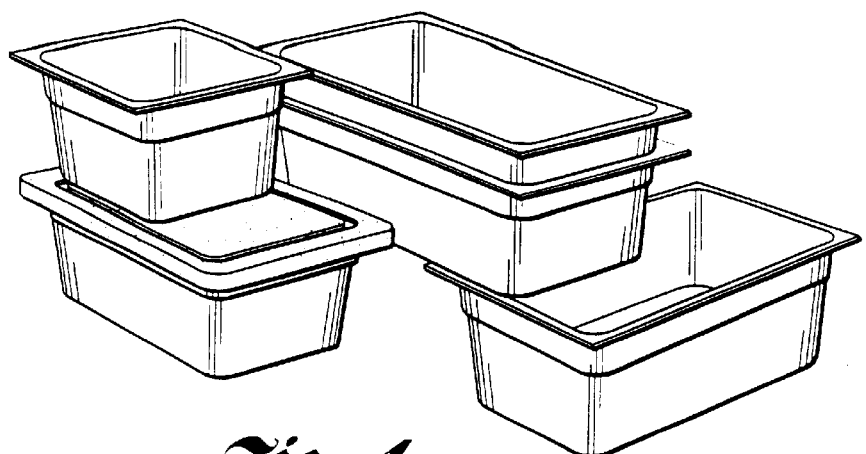
FIG. 4 is a perspective view of a plurality of prior art clear plastic pans or tubs for use in a food storage counter generally of the type shown in FIG. 1.
Figure 5:
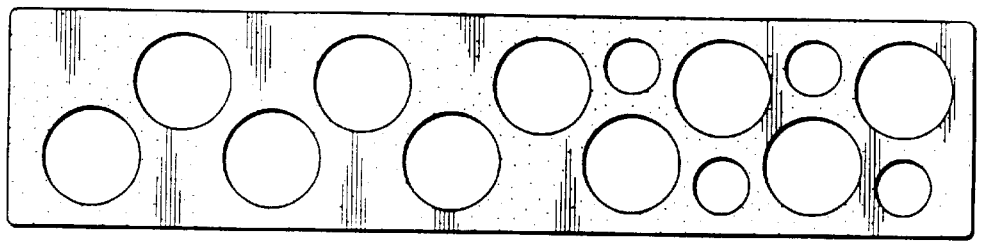
FIG. 5 is a top plan view of a prior art apertured plastic sheet for holding plastic food tubs and bottles of FIGS. 6 and 7, respectively, and is used in a food preparation station as illustrated in FIG. 1.
Figure 6:
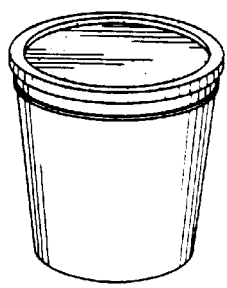
FIG. 6 is a perspective view of a prior art clear plastic food tub and lid for use in the plastic sheet of FIG. 5.
Figure 7:
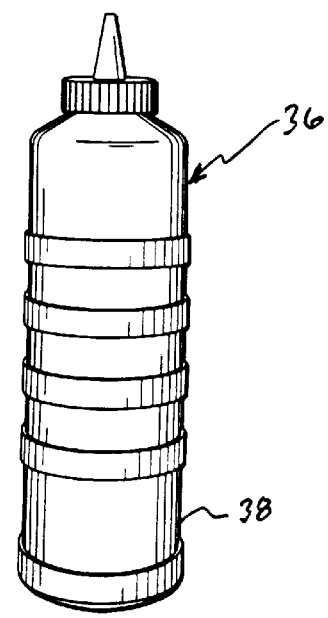
FIG. 7 is a front elevational view of a prior art clear plastic squeeze bottle for storing liquid food items and for use in the plastic sheet of FIG. 5.
Figure 9:
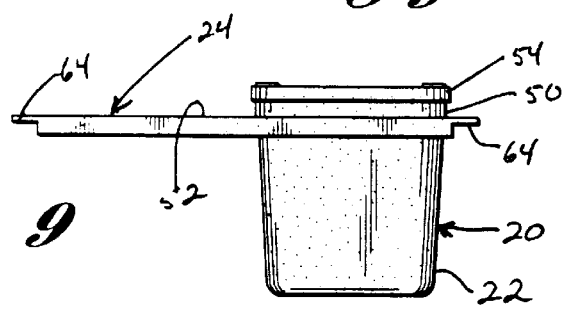
FIG. 9 is a side elevational view of the panel of FIG. 8 holding a food container with a lid elevated above the upper surface of the panel to permit easy removal and rotation or replacement of food tubs and easy removal and attachment of the lid.
Figure 13:
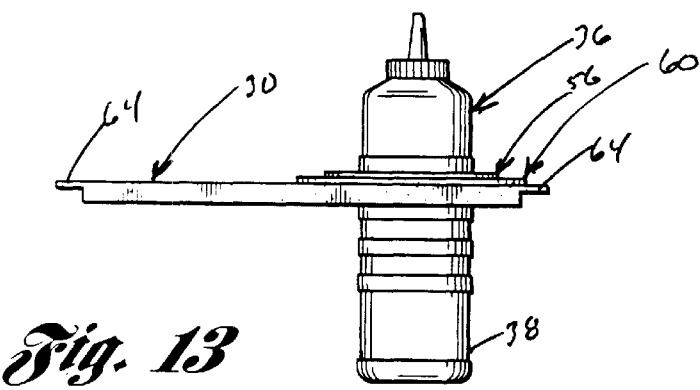
FIG. 13 is a side elevational view of the square panel of FIG. 12 on the panel of FIG. 11 for receiving and retaining a squeeze bottle of FIG. 7 with a ring of FIG. 15 therearound.
Figure 16:
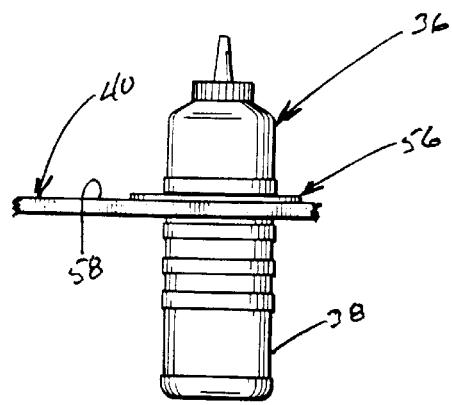
FIG. 16 is a side elevational view, partially broken away, of a squeeze bottle of FIG. 7 with a ring of FIG. 15 thereabout located in one of the round holes in the panel of FIG. 14.

The present invention is generally a kit of parts from which a plurality of desired parts are selected and arranged to store a plurality of food items in a refrigerated space at a food preparation station. A typical station is shown in FIG. 1. The kit includes a plurality of food containers, such as square plastic food tubs or containers, an example of which is shown in FIG. 9. Another type of food container is a clear plastic squeeze bottle for liquid food items such as dressing as illustrated in FIGS. 7, 13 and 16. Each container is to contain a food item in a lower portion thereof.

The kit of the present invention also includes a plurality of panels, as illustrated in FIGS. 8, 9, 10, 11, 13, 14, 16, 17, 18 and 19. The panels may be metal, such as stainless steel, or plastic, such as high density polyethylene. Each of the panels have upper and lower surfaces. When selected panels are arranged side-by-side at the food preparation station of FIG. 1, the panels form an upper insulating wall of the refrigerated space. A first set of the panels of FIGS. 8, 9, 10, 11, 13, 14 and 16 has an array of holes for receiving and retaining the containers therein so that the lower portions of the containers are suspended in the refrigerated space below the lower surfaces of the arranged panels. The plastic of the plastic insulating panels may be food quality plastic such as polyethylene, polypropylene or polystyrene.

In particular, a first container, generally indicated at 20 of FIG. 9, has a generally square lower portion 22. An 8-hole panel, generally indicated at 24 in FIG. 8, has an array of generally square holes 26 for receiving and retaining the generally square lower portion 22 of such containers.

Figure 10:
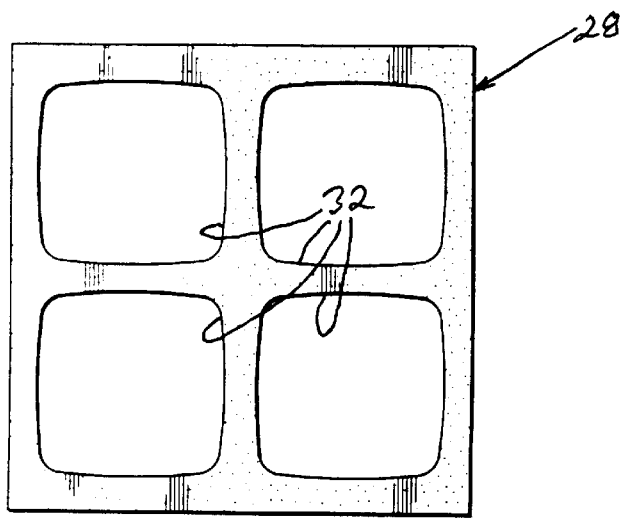
FIG. 10 is a top plan view of a 4-hole plastic insulating panel of the kit.
Figures 11, 12:
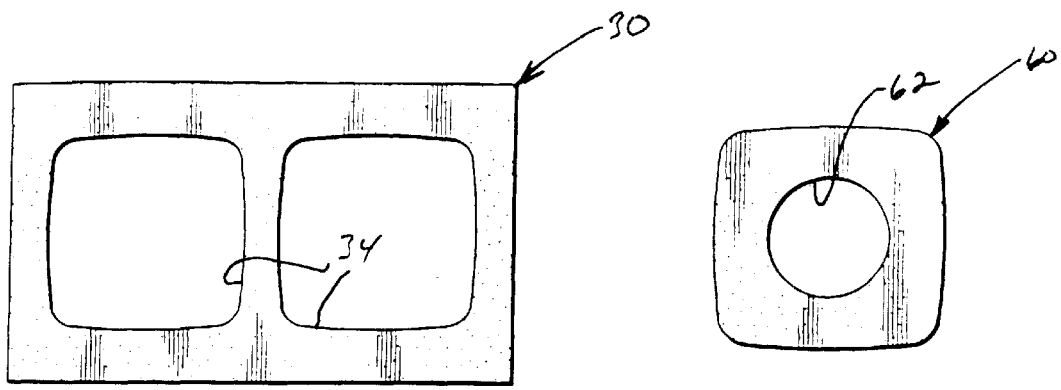
FIG. 11 is a top plan view of a 2-hole plastic insulating panel of the kit.
FIG. 12 is a top plan view of an insulating member in the form of a square panel having a hole for receiving and retaining a bottle in a square hole as shown in FIG. 13.

In like fashion, a 4-hole panel, generally indicated at 28 in FIG. 10, and a 2-hole panel, generally indicated at 30 in FIG. 11, all include similar square holes 32 and 34, respectively.

As illustrated in FIGS. 7, 13 and 16, a second set of the containers, one of which is generally indicated at 36, have generally round lower portions 38. The kit of parts also includes a panel, generally indicated at 40 in FIG. 14, including generally round holes 42 for receiving and retaining the generally round lower portions 38 of the second set of containers 36 therein.

Figure 17:
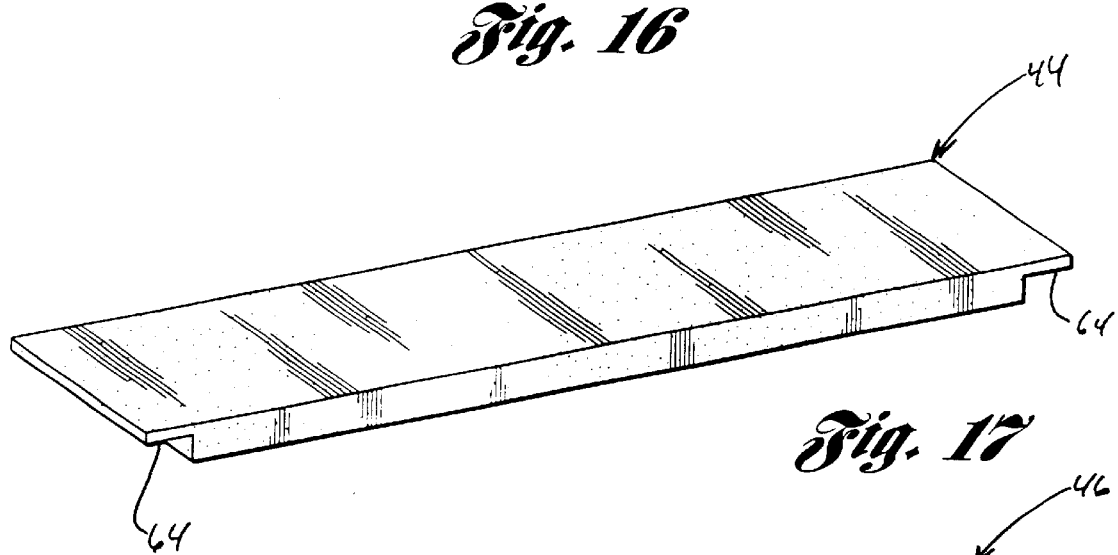
FIGS. 17–19 are perspective views of plastic spacer panels or spacers of the kit, which have different widths but the same length to ensure that the various parts of the kit fit makelines of various lengths.
Figure 18:
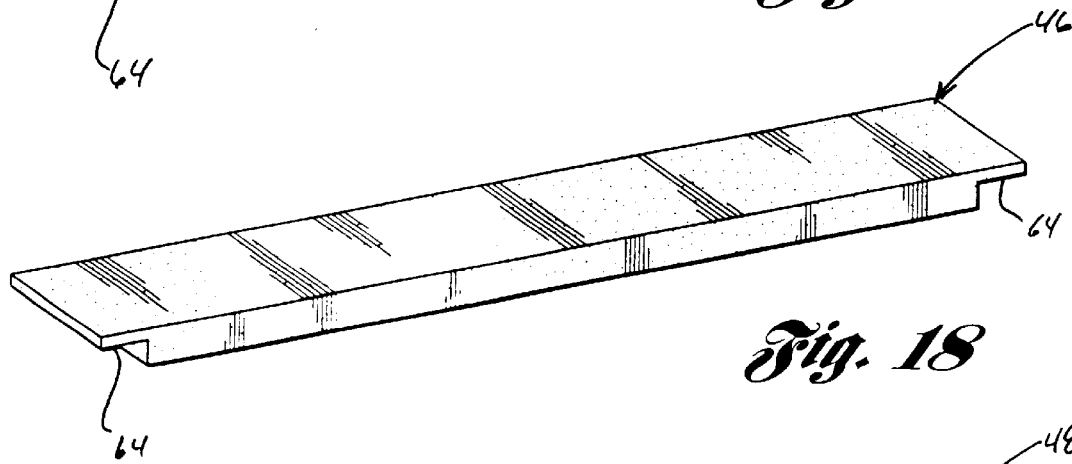
Figure 19:
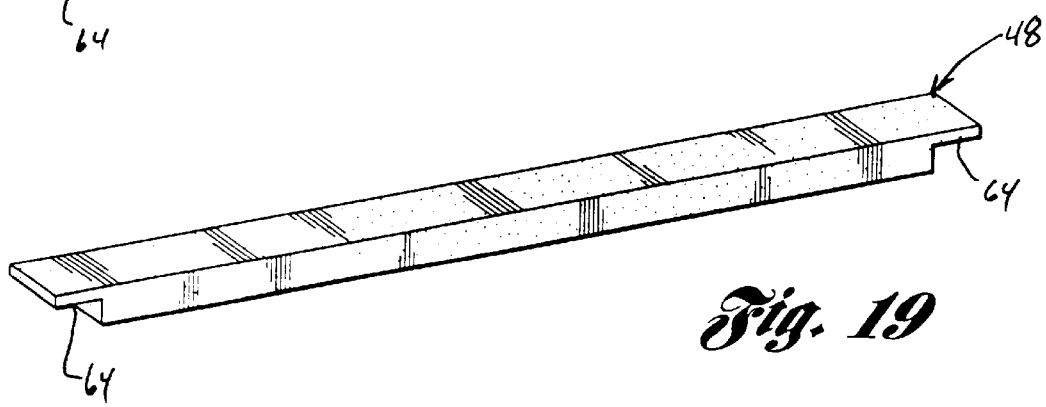

As shown in FIGS. 17–19, the kit of parts also includes a set of plastic spacers or spacer panels, generally indicated at 44, 46 and 48, respectively. The panels 44, 46 and 48 are substantially identical to one another except for their width to ensure that the panels selected from the kit of parts form a substantially continuous upper wall for the refrigerated space with no gaps therebetween allowing the rail to maintain a desired temperature in its refrigerated space.

The upper surfaces of the arranged panels 24, 28, 30, 40, 44, 46 and/or 48 provide a substantially flat, continuous surface to prevent food items from falling into the refrigerated space when arranged side-by-side.

In like fashion, the lower surfaces of the arranged panels 24, 28, 30, 40, 44, 46 and/or 48 provide a substantially flat, continuous surface to maintain refrigerated air within the refrigerated space.

Figure 8:
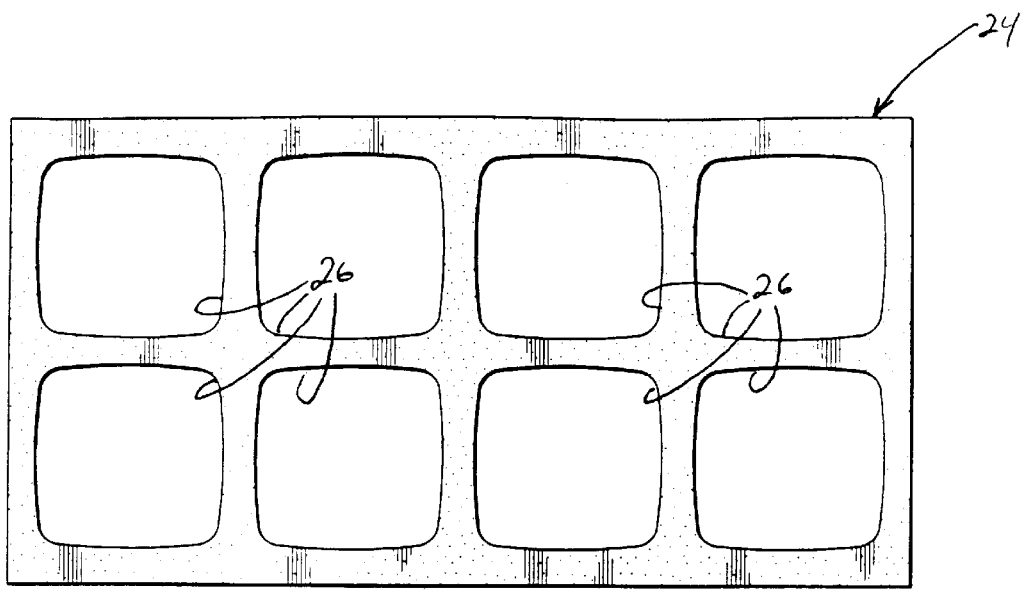
FIG. 8 is a top plan view of an 8-hole plastic insulating panel of a kit of the present invention.

As shown in FIGS. 8, 10 and 11, the square holes 26, 32 and 34, respectively, of the first set of panels 24, 28 and 30, respectively, are preferably arranged in rows and columns to maximize the number of square holes for various food items.

As shown in FIG. 9, a lid-receiving upper portion 50 of the container 20 is spaced above an upper surface 52 of the panel 24 when the container 20 is received and retained in its hole to permit easy removal of the container 20 from the panel 24. As also shown in FIG. 9, a lid 54 is positioned on the upper portion 50 of the container 20 and is also easy to remove and replace.

Figures 14, 15:
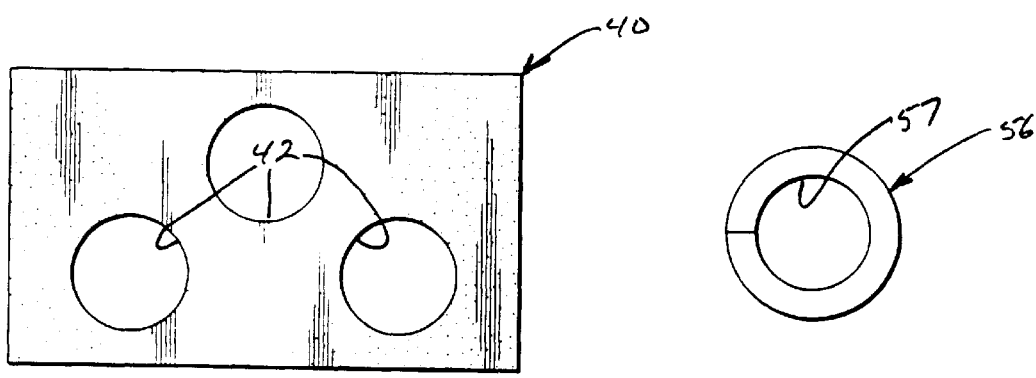
FIG. 14 is a top plan view of a 3-hole plastic insulating panel for receiving and retaining squeeze bottles having rings of FIG. 15 therearound.
FIG. 15 is a top plan view of a split ring by which a squeeze bottle of FIG. 7 can be supported within the apertured panel of FIG. 14.

In general, the kit also includes at least one plastic insulating member having a hole for receiving and retaining a generally round lower portion of the containers 36. In FIG. 15, the member is a split ring, generally indicated at 56, having a generally round inner hole 57 and which is supported on the upper surface 58 of the panel 56 about one of its holes for supporting the lower portion 38 of the container 36 in the refrigerated space, as shown in FIG. 16. The ring 56 is split so it is flexible enough to hold onto a ridge formed about the container 36, but is rigid enough to support the container 36 within the hole 42 of the panel 40.

In FIG. 12, the member is a substantially square plastic insulating panel, generally indicated at 60, which has a generally square hole 62. In this way, as illustrated in FIG. 13, the panel 60 can convert a square hole 34 of the panel 30 into a round hole (i.e., 62) for receiving and retaining the bottle 36 with the ring 56 thereabout.

Each of the panels 24, 28, 30, 40, 44, 46 and 48 includes an overhang portion 64 formed at opposite ends thereof for support of its respective panel at the food preparation station. In this way, the panels 24, 28, 30, 40, 44, 46 and 48 can accommodate different widths between rails which support the panels 24, 28, 30, 40, 44, 46 and 48. Oftentimes, different models of makelines have different widths between their rails.

The present invention obviates the drawbacks found in the prior art by providing a lightweight, flexible, and modular kit and panel for food preparation as well as a kit and panel for the selection and storage of food ingredients for the quick service restaurant (QSR) industry. The present invention allows the user to selectively place specific volumes of food items in containers having varied volumetric capacity dependent upon the frequency that those food items are required to be selected in the course of food preparation. Accordingly, each food service application can select the size, shape, and volume of its required food ingredients and utilize the modular feature of the present invention to facilitate ergonomic preparation of food items along the makeline. In addition, the present invention provides module tubs which can be removed, stored, and stacked in a refrigerated section of the facility for later use without running the risk of product spoilage.

While the best mode for carrying out the invention has been described in detail, those familiar with the art to which this invention relates will recognize various alternative designs and embodiments for practicing the invention as defined by the following claims.

What is claimed is:

1. A kit from which a plurality of parts are selected and arranged to store a plurality of food items in a refrigerated space at a food preparation station having rails over the refrigerated space, the kit comprising:

a plurality of plastic food containers each having an upper rim and upper and lower portions, each container having a larger cross-sectional area proximate the upper portion than the cross sectional area proximate the lower portion, each container to contain a food item in the lower portion thereof;

a first set of panels comprising a plurality of food quality plastic panels, each of the panels having upper and lower surfaces and overhang portions at opposite ends thereof to support the panels on the rails; and a second set of panels comprising a plurality of food quality plastic spacer panels without holes, the spacer panels of varying widths to ensure that the panels selected from the kit form a substantially continuous upper wall over the refrigerated space, the spacer panels having overhang portions at opposite ends thereof to support the spacer panels on the rails;

wherein when selected panels are arranged side-by-side at the food preparation station, the panels form an upper wall of the refrigerated space and wherein the panels from the first set of the panels have a plurality of holes arranged in a two-dimensional array, each hole adapted to receive one of the plurality of containers wherein the hole is sized larger than the cross sectional area proximate the lower portion of a container but smaller than the cross sectional area proximate the upper portion of the container such that the container forms a seal around the hole and the container is supported such that the upper rim of the container is spaced above the panels so that the lower portions of the containers are suspended in the refrigerated space below the lower surfaces of the arranged panels.

2. The kit as claimed in claim 1 wherein a first set of the containers have generally square lower portions and wherein the array of holes include generally square holes for receiving and retaining the generally square lower portions of the first set of containers therein.

3. The kit as claimed in claim 1 wherein a second set of the containers have generally round lower portions and wherein the array of holes include generally round holes for receiving and retaining the generally round lower portions of the second set of containers therein.

4. The kit as claimed in claim 1 wherein the upper surfaces of the arranged panels provide a substantially flat, continuous surface to prevent food items from falling into the refrigerated space.

5. The kit as claimed in claim 1 wherein the lower surfaces of the arranged panels provide a substantially flat, continuous surface to maintain refrigerated air within the refrigerated space.

6. The kit as claimed in claim 1 wherein the containers are plastic food containers.

7. The kit as claimed in claim 1 wherein a lid-receiving upper portion of each of the containers is spaced above the upper surface of the arranged panels when the containers are received and retained in the array of holes to permit easy removal of the containers from the first set of panels.

8. The kit as claimed in claim 1 further comprising at least one member having a hole for receiving and retaining a generally round lower portion of one of the containers, the at least one member engaging the upper surface of one of the first set of panels about one of the array of holes for supporting the lower portion of the one of the containers in the refrigerated space.

9. The kit as claimed in claim 8 wherein the at least one member is a ring and wherein the one of the array of holes is a generally round hole.

10. The kit as claimed in claim 8 wherein the at least one member is a substantially square panel and wherein the one of the array of holes is a generally square hole.

11. The kit as claimed in claim 1 wherein each of the panels includes an overhang portion formed at opposite ends thereof for support of the panel at the food preparation station.

12. The kit of claim 1 wherein at least one of the plurality of food containers comprise tapered side walls.

13. A kit from which a plurality of parts are selected and arranged to store a plurality of food items in a refrigerated space at a food preparation station, the kit comprising:

a plurality of food containers, each container to contain a food item in a lower portion thereof;

a plurality of panels, each of the panels having upper and lower surfaces, wherein when selected panels are arranged side-by-side at the food preparation station, the panels form an upper wall of the refrigerated space and wherein a first set of the panels has an array of holes for receiving and retaining the containers therein so that the lower portions of the containers are suspended in the refrigerated space below the lower surfaces of the arranged panels;

at least one member having a hole for receiving and retaining a generally round lower portion of one of the containers, the at least one member engaging the upper surface of one of the first set of panels about one of the array of holes for supporting the lower portion of the one of the containers in the refrigerated space; and wherein the at least one member is a substantially square panel and wherein the one of the array of holes is a generally square hole.

* * * * *